United States Patent [19]

Schwarz et al.

[11] Patent Number: 4,523,139
[45] Date of Patent: Jun. 11, 1985

[54] ELECTRONIC SWITCHING POWER SUPPLY

[75] Inventors: Gerhard Schwarz, Altena; Günther Bergk, Raunheim, both of Fed. Rep. of Germany

[73] Assignee: Braun Aktiengesellschaft, Kronberg, Fed. Rep. of Germany

[21] Appl. No.: 493,460

[22] Filed: May 11, 1983

[30] Foreign Application Priority Data

May 17, 1982 [DE] Fed. Rep. of Germany ....... 3218594

[51] Int. Cl.$^3$ ............................................... H02J 7/04
[52] U.S. Cl. .............................. 320/40; 320/DIG. 1; 363/21
[58] Field of Search ...................... 320/39, 40, DIG. 1; 363/18, 19, 20, 21; 331/112

[56] References Cited

U.S. PATENT DOCUMENTS

| | | | |
|---|---|---|---|
| 4,316,242 | 2/1982 | Colangelo et al. | 363/21 |
| 4,376,263 | 3/1983 | Pitroff et al. | 320/35 |
| 4,441,147 | 4/1984 | Schwarz | 363/21 |
| 4,464,619 | 8/1984 | Schwarz et al. | 320/40 |

FOREIGN PATENT DOCUMENTS

| | | |
|---|---|---|
| 362023 | 9/1980 | Austria . |
| 0030026 | 11/1980 | European Pat. Off. . |
| 0057910 | 2/1982 | European Pat. Off. . |
| 2319068 | 4/1973 | Fed. Rep. of Germany . |
| 2751578 | 11/1977 | Fed. Rep. of Germany . |
| 2902463 | 1/1979 | Fed. Rep. of Germany . |
| 2948054 | 11/1979 | Fed. Rep. of Germany . |

*Primary Examiner*—Peter S. Wong
*Assistant Examiner*—Anita M. Ault
*Attorney, Agent, or Firm*—Raymond J. De Vellis

[57] ABSTRACT

An electronic switching power supply for supplying power to an electrical load from a variable voltage level AC or DC voltage source having first and second terminals, the power supply including a transformer having a primary coil and a secondary coil, a first terminal of the secondary coil being connected to the electrical load, a first transistor connected in series with the primary coil, a first diode connected in series with the secondary coil and the electrical load, a first capacitor connected between the base of the first transistor and a second terminal of the secondary coil, a second transistor, the collector-emitter line of which is connected across the voltage source, a first resistor connected between the first terminal of the secondary coil and the collector of the second transistor, a second resistor connected between the first terminal of the secondary coil and the emitter of the first transistor, and a discharge circuit connected between the first capacitor and the electrical load, whereby the first capacitor is electrically charged during a conducting phase of the first transistor, and during a subsequent blocking phase of the first transistor, the electrical load receives the charge built up in the first capacitor during the preceding conducting phase.

6 Claims, 2 Drawing Figures

ELECTRONIC SWITCHING POWER SUPPLY

BACKGROUND OF THE INVENTION

1. Field of the Invention

This invention relates to electronic switching power supplies for supplying an electrical load from either an AC or a DC voltage source of an undetermined voltage level, and in the case of an AC source, of an undetermined frequency.

2. Description of the Prior Art

Electronic switching power supplies are used for supplying electrical or electronic devices with a constant voltage and/or constant current. Often such power supplies are constructed as a primary or secondary pulsed blocking oscillator, throughflow converter or push-pull converter. Generally, they are provided with a rectifier circuit connected in series with a filtering and smoothing arrangement and a transformer or choke. In cases where a transformer is utilized, the electronic switch is generally operated at a frequency of about 20 kHz, in order to keep the size of the transformer small.

It is desirable that portable electrical and electronic devices (for example, electric shavers, electronic flash units, radio and television units, etc.) can be operated at different voltages, or if these devices are provided with storage batteries, the storge batteries themselves can be charged to different voltages. Both AC and DC voltages ranging from 110 to 240 Volts and, and in the case of AC voltages, having operating frequencies between 50 Hz and 60 Hz are suitable for this purpose.

German Offenleggungschrift No. 2,751,578 discloses a switching arrangement operable to furnish a regulated voltage through the use of a blocking oscillator, having a primary coil connected with the input voltage source through a transistor which is switched in through positive feedback and through a emitter resistor. In the circuit arrangement there shown, the swith-on time of the transistor is dependent upon the input voltage, and the transistor's switch-on time decreases as the input voltage rises. As a result, the change in the switching frequency of the transistor leads to a corresponding change in the average output power. However, this known circuit arrangement is not suitable for the rapid charging of a storage battery able to supply a load independent of the line.

European Patent Application No. A1-80,107,474.1 describes a power supply which can be operated at various DC and AC voltages, as well as at various AC frequencies, without requiring a switchover. A blocking oscillator is controlled by two controllable semiconductor switches dependent upon the current flowing through the primary coil of a transformer and dependent upon the applied input voltage. The blocking oscillator is controlled such that the output power which is delivered is preferably constant. A parallel circuit consisting of a storage battery and a DC motor acts as an electrical load, such that the power supply delivers either the full motor power or, if the motor is switched off, a charge current for the storage battery. In this arrangement, the storage battery (consisting of nickel cadmium cells) is rapidly charged with a high current when the DC motor is switched off. A voltage dependent switch is provided to avoid damage to the storage battery during the rapid charging. The protective switch includes a transistor, the collector of which is connected through a resistor to the base of a switching transistor connected in series with a transformer, and the base-emitter line of which is connected in series with another resistor and a Zener diode in parallel with the storage battery. If, during charging, the storage battery exceeds a value set by the Zener diode, the transistor switches through and thereby blocks the switching transistor connected in series with the primary coil of the transformer. In this known circuit, the switched-on and switched-off times of the blocking oscillator are dependent upon currents flowing through two different resistors, such that a hysteresis behavior results from the difference in the two resistor currents. The blocking oscillator is not constantly switched back and forth between the on and off states, but the storage battery voltage must have fallen to a certain level before the charge current is again switched on. When the blocking oscillator is switched off, a light-emitting diode situated in the base circuit of the second transistor is extinguished, thus indicating a termination of the charging process.

However, such a power supply for fast-charging a storage battery with a primary pulsed blocking oscillator has a relatively low efficiency, due to the required standby voltage for supporting the control and regulation electronics. Additionally, when the supply line plug is not connected (i.e., when the device is operating solely under power supplied by the storage battery), the current is constantly being drawn from the storage battery to operate the supporting control and regulation electronics. Still further, the components required to construct such a power supply are relatively expensive.

One object of the present invention is the provision of an electronic switching power supply for supplying current to an electrical load from AC or DC voltage sources of different voltage levels, which requires little circuitry and which is suitable for the fast-charging of rechargeable batteries. It is another object of the invention that the power supply guarantee a transition from a high fast-charging current to a lower maintenance current when a set output voltage is approached or reached. Preferably, errors in detecting the battery voltage due to varying internal resistances of the battery cells are avoided, and energy is not consumed for supporting control and regulation electronics when the power supply is not connected to an AC or DC supply line.

SUMMARY OF THE INVENTION

In general, the invention features an electronic switching power supply for supplying power to an electrical load from a variable voltage level AC or DC voltage source having first and second terminals, the power supply including a transformer having a primary coil with first and second terminals and a secondary coil with first and second terminals, the first terminal of the secondary coil being connected to the electrical load, a first transistor having a base, an emitter and a collector, the emitter-collector path of the first transistor being coupled in series with the primary coil, the series connection of the emitter-collector path of the first transistor and the primary coil being electrically coupled to the variable level AC or DC voltage source, a first diode connected in series with the secondary coil and the electrical load, a first capacitor connected between the base of the first transistor and the second terminal of the second coil, a second transistor having a base, an emitter and a collector, the collector of the second transistor being connected to the base of the first transistor and the emitter of the secod transistor being connected to the second terminal of the voltage source, a first resistor connected between the first terminal of, the voltage source and the base of the first transistor, a second resistor connected between the first terminal of the secondary coil and the emitter of the first transistor, a first Zener diode connected between the emitter of the first transistor and the base of the second transistor, a third transistor having a base, an emitter and a collector, the emitter of the third transistor being connected to the first terminal of the secondary coil, a second diode, the cathode of which is connected to the second terminal of the secondary coil and the anode of which is connected to both the anode of a third diode and to the base of the third transistor through a third resistor, a fourth resistor connected between the collector of the third transistor and the base of the second transistor, a fifth resistor connected between the first terminal of the secondary coil and the collector fo the second transistor and a discharge circuit connected between the first capacitor and the electrical load, whereby the first capacitor is electrically charged during a conducting phase of the first transistor, and during a subsequent blocking phase of the first transistor, the electrical load receives the charge built up in the first capacitor during the preceding conducting phase.

These and other features of the invention will be made clear through a description of a number of preferred embodiments, reference being had to the accompanying drawings wherein:

DESCRIPTION OF THE PREFERRED EMBODIMENTS

Figure 1:
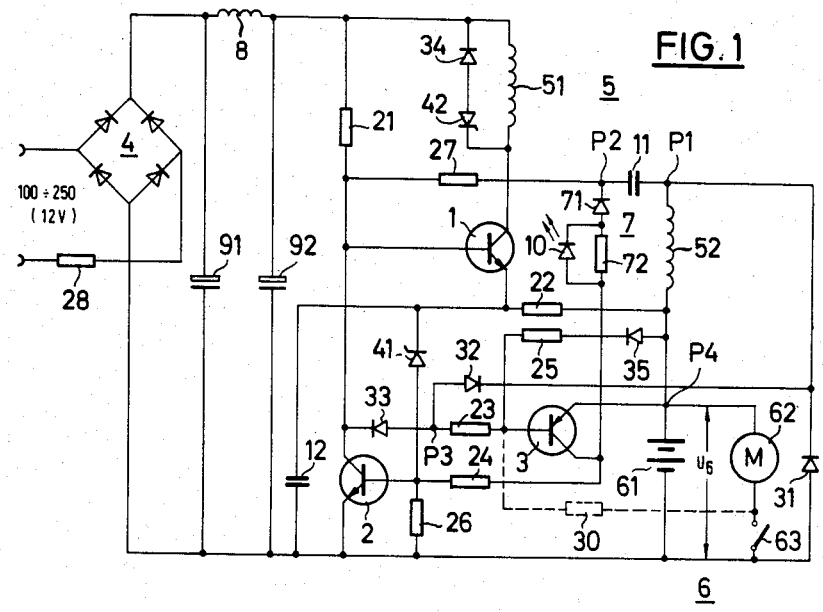
FIG. 1 is a schematic diagram of an electronic switching power supply having control and regulation electronics according to the invention for the fast-charging of a storage battery with an automatic transition to a maintenance charge.

Referring now to FIG. 1, an electronic switching power supply according to the present invention includes a primary pulsed blocking oscillator having a transformer 5, a first transistor 1 and a first diode 31 in the load circuit thereof. The blocking oscillator is supplied through a rectifier bridge circuit 4 and a resistor 28 from an AC or a DC network, the voltage of which can range between 100 and 250 volts (in the extreme, even 12 volts) and the frequency of which, in the case of an AC supply line, can be nearly arbitrary. The rectified output voltage produced by bridge circuit 4 is delivered to the remainder of the power supply through a filtering and smoothing arrangement consisting of a linear choke 8 and two smoothing capacitors 91 and 92.

Tranformer 5 includes a primary coil 51 connected in series with the collector-emitter line of a first transistor 1 and a second capacitor 12 to form a series circuit which is connected across and in parallel with the DC terminals provided on bridge circuit 4. A first resistor 21 is connected to the base of first transistor 1, and the other terminal of first resistor 21 is connected through linear choke 8 to the positive DC terminal of bridge circuit 4. The base of first transistor 1 is additionally connected through the collector-emitter line of a second transistor 2 to the ground or reference potential. The emitter of first transistor 1 is connected to the cathode of a first Zener diode 41, the anode of which is connected with the base of second transistor 2 and also, through a resistor 26 to the ground or reference potential terminal. The emitter of first transistor 1 is also connected, through a second resistor 22, to a first terminal of the secondary coil 52 of transformer 5.

A first capacitor 11 is connected directly to the second terminal of secondary coil 52 and is also connected through a resistor 27 to the base of first transistor 1. A load 6 consists of a storage battery 61 and a series circuit comprising a switch 63 and a DC motor 62 connected in parallel. The load and the anode of a fifth diode 35 are both connected to the first terminal of secondary coil 52. A fifth resistor 25 is connected between the cathode of diode 35 and the base of a third transistor 3. A second diode 32 has an anode connected to the junction of a third resistor 23 and a third diode 33 and a cathode which is connected to the second terminal of secondary coil 52, as is the cathode of first diode 31, the anode of which is connected with load 6.

First capacitor 11 is additionally connected to a discharge circuit 7, consisting of a discharge resistor 72 and a discharge diode 71 connected in parallel. The cathode of discharge diode 71 is connected to first capacitor 11, and discharge resistor 72 is connected, at its other end, to the collector of third transistor 3. The emitter of transistor 3 is connected to both the first terminal of secondary coil 52 and to load 6.

To limit the back voltage, there is provided a circuit in parallel with primary coil 51 consisting of second Zener diode 42 and a fourth diode 34 connected in series, with the anodes of second Zener diode 42 and fourth diode 34 being connected to one another.

As shown in dashed lines in FIG. 1, the base of third transistor 3 can optionally be connected through an additional resistor 30 to the junction of DC motor 62 and switch 63.

The line supply current is first rectified by bridge circuit 4, then filtered and smoothed by means of linear choke 8 and capacitors 91 and 92 and supplied as a small base current through first resistor 21 to the base of first transistor 1, causing first transistor 1 to switch on. This produces a coupling effect through the switching line of first transistor 1 and primary coil 51, as a result of which first transistor 1 is additionally activated and is switched into the conducting state. The collector current of transistor 1 rises linearly and generates a proportional voltage at second resistor 22. When a predetermined peak current is reached, second transistor 2 is activated through first Zener diode 41. Second transistor 2 is thus switched to its conducting state to connect the base of first transistor 1 to the reference or ground potential, thus withdrawing the base current from first transistor 1. At this point, first transistor 1 enters a blocking phase, and the polarity of the voltage induced in secondary coil 52 changes at the connection point P1 of first capacitor 11 to secondary coil 52. In accordance with the principle of a blocking oscillator, the energy stored in transformer 5 is delivered via first diode 31 to load 6. During the discharge of transformer 5, fourth diode 34 and second Zener diode 42, connected in series across primary coil 51, limit the back voltage peak during the blocking phase.

A negative voltage at point P1 induced during the transformer discharge phase is transmitted through second diode 32 and reaches a junction point P3 located between third diode 33 and third resistor 23 in the base current circuit of third transistor 3. Due to this negative voltage, third transistor 3 which is designed as a PNP transistor is switched into a conducting state.

During the period that first transistor 1 is in a conducting state, first capacitor 11 is charged up through resistor 27 to a voltage equal to $U_{C11} = U_{sec}·(1 − e^{−t/\tau})$. $\tau$ means the time constant resulting from the product of resistance valve of resistor 27 and capacitance of capacitor 11. This is a negative polarity formed at point P2 of first capacitor 11. When third transistor 3 is switched to its conducting state, the negative polarity charge existing at point P2 flows through discharge circuit 7, namely, through discharge diode 71, discharge resistor 72 and light emitting diode 10, and through the collector-emitter line of third transistor 3 to a point P4 (i.e., to the positive terminal of storage battery 61). Thus, with the discharge of first capacitor 11 and subsequent reverse charging, light emitting diode 10 is illuminated and gives a visual indication that the charging process is taking place. Discharge resistor 72 connected in parallel with diode 10 guarantees reverse charging below the flow voltage of diode 10.

The voltage existing at reverse-charged first capacitor 11 is as follows:

$$U_{C11} = U_6(=U_{Batt}) − U_{F31} − U_{CEsatT3} + U_{F71}$$

where:
$U_{C11}$ = voltage at reverse-charged first capacitor 11;
$U_6$ = voltage at load 6;
$U_{F71}$ = voltage drop at discharge diode 71;
$U_{CEsatT3}$ = collector-emitter saturation voltage of third transistor 3; and
$U_{F31}$ = voltage drop across first diode 31.

The collector-emitter saturation voltage of third transistor 3 is negligible at the end of the reverse charging process of first capacitor 11. The on-voltage-drops at discharge diode 71 and first diode 31 are nearly equal, since similar diodes are used which therefore cancel one another. Accordingly, the voltage at reverse-charged first capacitor 11 corresponds to the load voltage $U_6$ with a positive sign at point P2.

The reverse-poled voltages existing at reverse-charged first capacitor 11 and load 6 are significant, since the positive voltage existing at point P2 insures that first transistor 1 will immediately switch on again when, following completion of the transformer discharge phase, the voltage comparator consisting of second and third transistors 2 and 3 switches into the blocking state as a result of the output voltage at point P4 not yet having been reached. This method of operation prevails even at very low operating voltages, for example, on the order of 12 volts.

When the output voltage $U_6$ reaches or exceeds its rated value, second and third transistors 2 and 3 remain conducting and first capacitor 11 has a DC connection with the positive terminal of load 6 at the point P1 via secondary coil 52 and also has a connection to the ground or reference potential at the point P2 via resistor 27 and conducting second transistor 2. Thus, point P2 becomes negative with respect to point P1. The magnitude of this negative voltage differential is determined by discharge diode 71, light-emitting diode 10, discharge resistor 72 and resistor 27. The switched-through voltage comparator consisting of conducting second and third transistors 2 and 3 prevents transistor 1 from switching on again until the load voltage $U_6$ falls below the prescribed rated value. At this time, the comparator consisting of second and third transistors 2 and 3 switches into the blocking phase, wherein first capacitor 11 is again recharged through first resistor 21 and resistor 27 to the sum of load voltage $U_6$ and the base-emitter voltage of first transistor 1. During this process, third diode 33 decouples the voltage divider consisting of third and fifth resistors 23 and 25 from first resistor 21. Diode 35 (preferably a germanium diode) is used to simulate electronically the voltage response of the storage battery as a function of temperature.

If resistor 30 (shown in phantom) is connected between the junction of third resistor 23 with the base of third transistor 3 and the junction of switch 63 with DC motor 62, the voltage divider consisting of third and fifth resistors 23 and 25 can be brought to low output level without an additional switch when motor 62 is switched on. The low output level can be on the order of, for example, 2.9 to 2.6 volts. As a result, a larger output current will be produced only when the average storage battery voltage falls below its lower limit. When connected to the line voltage supply, DC motor 62 does not then run steadily at the high final charge voltage of storage battery 61. After DC motor 62 is switched off, storage battery 61 is rapidly recharged.

It will be understood that the above-described structure and method of operation provides an inexpensive means for reducing a high fast-charging current provided to storage battery 61 to a low maintenance charging current upon approaching or reaching a predetermined voltage limit through the provision of a voltage comparator consisting of second and third transistors 2 and 3. Since the storage battery voltage is measured only under low load and not during the high charge current, errors due to different internal resistances among the individual cells of storage battery 61 are avoided. Additionally, since the voltage of reverse-charged first capacitor 11 is approximately equal to the load voltage, a standard charge can also be performed with a steady charge current of about 40 to 50 milliamperes, even at a low operating voltage of, for example, 12 volts. Finally, it is assured that the above-described control and regulation electronics will not draw current from storage battery 61 when the device is disconnected from the line voltage supply, since no current can then flow through the voltage comparator circuit or through the blocking oscillator.

Figure 2:
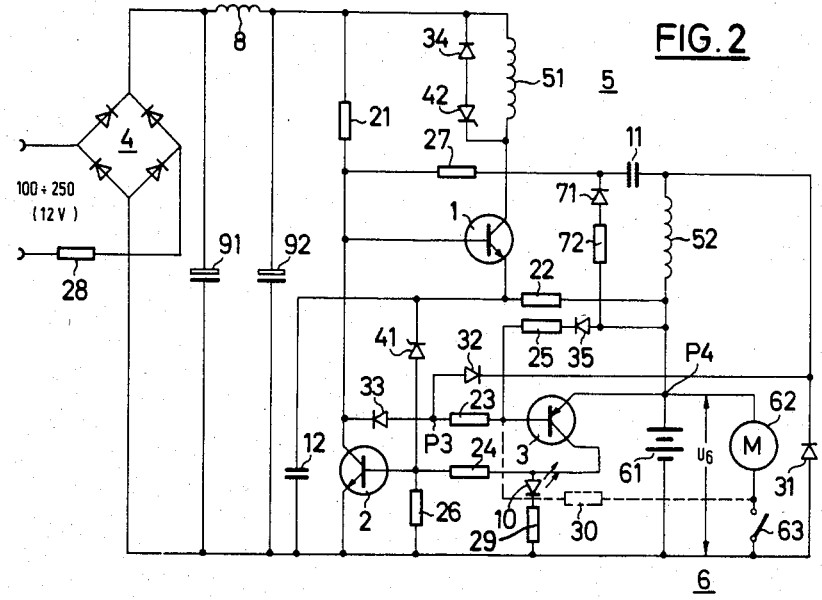
FIG. 2 is a schematic diagram of another embodiment of a power supply according to the invention, and further supplied with an indicator for providing a visual indication of when a transition occurs from the fast-charging to the maintenance charging state.

We refer now to FIG. 2, showing a variation of the circuit of FIG. 1 and wherein identical numerals are used to indicate components common to both circuits, reference being had to the above description as regards such common components.

The circuit of FIG. 2 differs from that of FIG. 1 in that light emitting diode 10 is not connected in parallel with discharge resistor 72, but rather is inserted into the collector circuit of third transistor 3, the anode of light emitting diode 10 being connected to the collector of third transistor 3 and the cathode of diode 10 being connected through a dropping resistor 29 to the ground or reference potential.

In the circuit of FIG. 2, light emitting diode 10 begins to blink at the completion of the fast-charging process and transition to the maintenance charging process. This is due to the fact that light emitting diode 10 is connected to storage battery 61 when the output voltage is reached. Since light emitting diode 10 has a relatively high current consumption, the storage battery voltage falls rapidly below the set rated value $U_A$ or the maximum storage battery voltage, and the comparator consisting of second and third transistors 2 and 3 switches into the blocking phase. Thereupon, the blocking oscillator circuit, via switching transistor 1, again delivers the energy withdrawn by light emitting diode 10 until the rated value of the comparator voltage has again been reached. This process, which is repetitive with approximately a 2 Hz cycle, indicates a transition into the maintenance charging state.

The maximum battery voltage in the circuit of FIG. 2, as in the circuit of FIG. 1, is given by:

$$U_{Battmax} = U_6 = [(R_{23}+R_{25})/R_{25}](U_{BeT3}-U_{F33}) + U_{F33} + U_{CEsatT2}$$

where:

$U_6$ = battery voltage
$R_{23}$ = resistance of third resistor 23
$R_{25}$ = resistance of fifth resistor 25
$U_{BE\ T3}$ = Base-Emitter-voltage of third transistor 3.
$U_{F33}$ = voltage drop across third diode 33 when in the conductive state.
$U_{CEsatT2}$ = saturation-collector-emitter voltage of second transitor 2.

While the present invention has been described by way of a number of preferred embodiments, various substitutions of equivalents may be effected without departing from either the spirit or scope of the invention as set forth in the following claims.

What is claimed as new and desired to be secured by Letters Patent of the United States is:

1. An electrical switching power supply for supplying power to an electrical load from a variable voltage level AC or DC voltage source having first and second terminals, comprising:

a transformer (5) having a primary coil with first and second terminals and a secondary coil with first and second terminals, said first terminal of said secondary coil being connected to said electrical load;

a first transistor (1) having a base, an emitter and a collector, the emitter-collector-path of said first transistor being coupled in series with said primary coil, the series connection of said emitter-collector-path of said first transistor and said primary coil being electrically coupled to said variable level AC or DC voltage source;

a first diode (31) having a cathode and an anode connected in series with said secondary coil and said electrical load;

a first capacitor (11) connected between said base of said first transistor and said second terminal of said secondary coil;

a second transistor (2) having a base, an emitter and a collector, said collector of said second transistor being connected to said base of said first transistor and said emitter of said second transistor being connected to said second terminal of said voltage source;

a first resistor (21) connected between said first terminal of said voltage source and said base of said first transistor;

a second resistor (22) connected between said first terminal of said secondary coil and said emitter of said first transistor;

a third resistor (23);

a first Zener diode (41) having an anode and a cathode connected between said emitter of said first transistor and said base of said second transistor;

a third transistor (3) having a base, an emitter and a collector, said emitter of said third transistor being connected to said first terminal of said secondary coil;

a second diode (32) having a cathode and an anode;

a third diode (33) having a cathode and an anode, said cathode of said second diode being connected to said second terminal of said secondary coil and said anode of said second diode being connected to both the anode of said third diode and to the base of said third transistor through said third resistor;

a fourth resistor (24) connected between said collector of said third transistor and said base of said second transistor;

a fifth resistor (25) connected between said first terminal of said secondary coil and said collector of said second transistor; and a discharge circuit connected between said first capacitor and said electrical load;

whereby said first capacitor is electrically charged during a conducting phase of said first transistor, and during a subsequent blocking phase of said first transistor, said electrical load receives the charge build up in said first capacitor during the said conducting phase.

2. A power supply as in claim 1, wherein said discharge circuit (7) comprises the series connection of a discharge resistor (72) and a discharge diode (71) having a cathode and an anode, said cathode of said discharge diode being connected to said first capacitor, said discharge resistor (72) being connected to said collector of said third transistor, said discharge circuit further comprising a light-emitting diode (10) being connected in parallel to said discharge resistor and having a cathode and an anode, said cathode of said light-emitting diode being connected to said anode of said discharge diode (71).

3. A power supply as in claim 1, wherein said discharge circuit (7) comprises the series connection of a discharge resistor (72) and a discharge diode (71) having an anode and a cathode, said cathode of said discharge diode being connected to said first capacitor (11), said discharge resistor (72) being connected to the connection of said electrical load with said first terminal of said secondary coil.

4. A power supply as in claim 3, wherein a light emitting diode (10) having a cathode and an anode, is connected in series to a dropping resistor (29) and the emitter-collector-path of said third transistor, the anode of said light-emitting diode being connected to said collector of said transistor, said series connection being connected in parallel to said electrical load.

5. A power supply as in any of the preceding claims, wherein said electrical load includes a storage battery and a DC motor and a switch connected in series and in parallel with said storage battery, and further comprises an additional resistor (30) connected between the junction of said DC motor and said switch and said base of said third transistor.

6. A power supply as in claim 5 further comprising a second Zener diode (42) having a cathode and an anode and a fourth diode (34) having a cathode and an anode connected in series across said primary coil with the anodes of said second Zener diode and said fourth diode being connected together, said cathodes of said second Zener diode and said fourth diode being connected to said first and second terminal of said primary coil.

* * * * *